US011277429B2

(12) United States Patent
Ababtain et al.

(10) Patent No.: US 11,277,429 B2
(45) Date of Patent: Mar. 15, 2022

(54) CYBERSECURITY VULNERABILITY CLASSIFICATION AND REMEDIATION BASED ON NETWORK UTILIZATION

(71) Applicant: Saudi Arabian Oil Company, Dhahran (SA)

(72) Inventors: Mohammed Ahmad Ababtain, Khobar (SA); Sultan Saadaldean Alsharif, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 214 days.

(21) Appl. No.: 16/196,544

(22) Filed: Nov. 20, 2018

(65) Prior Publication Data

US 2020/0162498 A1      May 21, 2020

(51) Int. Cl.
*H04L 29/06* (2006.01)
*H04L 43/062* (2022.01)
(Continued)

(52) U.S. Cl.
CPC ........ *H04L 63/1433* (2013.01); *H04L 43/062* (2013.01); *H04L 43/0876* (2013.01);
(Continued)

(58) Field of Classification Search
CPC .............. H04L 63/1433; H04L 43/062; H04L 43/0876; H04L 43/16; H04L 63/1416; H04L 63/1425; H04L 63/1441
See application file for complete search history.

(56) References Cited

U.S. PATENT DOCUMENTS 7,257,630 B2   8/2007   Cole et al.
7,308,712 B2   12/2007  Banzhof
(Continued)

OTHER PUBLICATIONS

International Search Report and Written Opinion in Corresponding Patent Application PCT/US2019/060736 dated Mar. 12, 2020. 9 pages.

(Continued)

*Primary Examiner* — Shin-Hon (Eric) Chen
(74) *Attorney, Agent, or Firm* — Leason Ellis LLP

(57) ABSTRACT

A technology solution for remediating a cyberattack risk in a computing resource asset in a network system. The technology solution includes monitoring data traffic directed to the computing resource asset in the network system along with data traffic to one or more additional computing resource assets in the network system, generating network utilization data based on the monitored data traffic to the computing resource asset and the monitored data traffic to the one or more additional computing resource assets in the network system, receiving a common vulnerability score (CVSS) for a vulnerability in the computing resource asset, determining a network traffic adjustment (NTA) value for the common vulnerability score (CVSS) based on the network utilization data, adjusting the common vulnerability score (CVSS) by the network traffic adjustment (NTA) value to generate a prioritized common vulnerability score (PCVSS) for the computing resource asset, and remediating the computing resource asset to resolve the vulnerability based on the prioritized common vulnerability (PCVSS) score.

7 Claims, 5 Drawing Sheets

(51) Int. Cl.
*H04L 43/0876* (2022.01)
*H04L 43/16* (2022.01)

(52) U.S. Cl.
CPC .......... *H04L 43/16* (2013.01); *H04L 63/1416* (2013.01); *H04L 63/1425* (2013.01); *H04L 63/1441* (2013.01)

(56) References Cited

U.S. PATENT DOCUMENTS

| | | | |
|---|---|---|---|
| 7,788,718 B1* | 8/2010 | Fei | H04L 63/1458 726/22 |
| 8,479,297 B1 | 7/2013 | Edkulla et al. | |
| 9,276,951 B2 | 3/2016 | Choi et al. | |
| 9,692,778 B1 | 6/2017 | Mohanty | |
| 9,985,983 B2 | 5/2018 | Seiver et al. | |
| 10,095,866 B2 | 10/2018 | Gong et al. | |
| 2012/0215575 A1* | 8/2012 | Deb | G06Q 10/0635 705/7.12 |
| 2013/0074188 A1 | 3/2013 | Giakouminakis et al. | |
| 2013/0191919 A1* | 7/2013 | Basavapatna | H04L 63/1408 726/25 |
| 2014/0137257 A1* | 5/2014 | Martinez | H04L 63/1433 726/25 |
| 2014/0189873 A1 | 7/2014 | Elder et al. | |
| 2014/0283083 A1* | 9/2014 | Gula | H04L 63/1433 726/25 |
| 2016/0036837 A1* | 2/2016 | Jain | H04L 63/1416 726/23 |
| 2018/0032736 A1* | 2/2018 | Inagaki | G06Q 10/0635 |
| 2018/0211047 A1 | 7/2018 | Olson et al. | |
| 2018/0309778 A1* | 10/2018 | Sugarbaker | H04L 63/1433 |
| 2019/0182132 A1* | 6/2019 | Gupta | H04L 43/0876 |
| 2019/0258804 A1* | 8/2019 | Glenn | H04L 63/1425 |
| 2019/0289029 A1* | 9/2019 | Chawla | H04L 63/1425 |
| 2020/0012796 A1* | 1/2020 | Trepagnier | G06N 3/08 |
| 2020/0162497 A1* | 5/2020 | Iyer | H04L 63/1433 |

OTHER PUBLICATIONS

International Preliminary Report in Patentability in Corresponding Patent Application PCT/US2019/060736 dated May 25, 2021. 7 pages.

* cited by examiner

| Rating | CVSS Score |
|---|---|
| None | 0.0 |
| Low | 0.1 – 3.9 |
| Medium | 4.0 – 6.9 |
| High | 7.0 – 8.9 |
| Critical | 9.0 – 10.0 |

FIG. 4A

| Traffic | Score to be added |
|---|---|
| Low | 0.0 |
| Medium | +1.0 |
| High | +2.0 |

FIG. 4C

| Traffic | asset |
|---|---|
| Low | 40% *lowest percentile of network traffic* |
| Medium | 40 - 80% *mid percentile of network traffic* |
| High | 20% *top percentile of network traffic* |

FIG. 4B

| Vulnerabilities | CVSS score | Old rating | Traffic | New score | New Rating |
|---|---|---|---|---|---|
| Vulnerability A | 2.1 | Low | Medium | 3.1 | Low |
| Vulnerability B | 6.0 | Medium | High | 8.0 | High |
| Vulnerability C | 7.5 | High | Low | 7.5 | High |

FIG. 4D

CYBERSECURITY VULNERABILITY CLASSIFICATION AND REMEDIATION BASED ON NETWORK UTILIZATION

FIELD OF THE DISCLOSURE

The present disclosure relates to a system, a method, and a computer program for detecting, identifying, assessing and remediating security vulnerabilities in a network system, and, more particularly, for detecting, identifying, assessing, and remediating vulnerabilities in computing resource assets or groups of computing resource assets in a network system.

BACKGROUND OF THE DISCLOSURE

A cybersecurity flaw is often referred to in the industry as a vulnerability, and it is defined in the ISO/IEC 27002 information security standard as "a weakness of an asset or group of assets that can be exploited by one or more threats." The ISO/IEC 27002 standard is published by the International Organization for Standardization (ISO) and the International Electrotechnical Commission (IEC), A computing resource asset can include any device that has an Internet Protocol (IP) address, including, for example, a router, a switch, a server, a printer, a scanner, a computing device, a communicating device, or the like. A system that is commonly employed to identify and assess principal characteristics of vulnerabilities in computing resource assets is the Common Vulnerability Scoring System (CVSS), which was the result of research carried out by the National Infrastructure Advisory Council (NIAC).

The CVSS is a free and open industry standard for assessing the severity of computer system security vulnerabilities. CVSS produces and assigns numerical scores to vulnerabilities in computing resource assets. Scores are typically between 0 and 10, with 10 being representative of the most severe vulnerabilities. Its quantitative model ensures repeatable accurate measurement while enabling visibility into the underlying vulnerability characteristics that were used to generate the scores. These scores can be used to calculate the risks associated with the vulnerabilities, as well as to prioritize remediation efforts. However, when the number of detected vulnerabilities is high, the CVSS scores can be ambiguous and may not reflect the true risks associated with the vulnerabilities. Therefore, there exists an unfulfilled need for a technology solution for detecting, identifying, accurately assessing vulnerabilities and remediating the vulnerabilities in computing resource assets or groups of computing resource assets based on a reclassification and reprioritization of the vulnerabilities. The present disclosure addresses this and other needs.

SUMMARY OF THE DISCLOSURE

The disclosure provides a novel technology solution, including a method, a system, and a computer program for detecting, identifying and accurately assessing vulnerabilities in computing resource assets. According to an aspect of the disclosure, a cyberattack risk remediation system for remediating a vulnerability in a computing resource asset in a network system is provided. The system can generate a veritable assessment for a vulnerability in a computing resource asset or group of computing resource assets. The system can remediate the vulnerability based on a veritable score in the veritable assessment for the vulnerability. According to a non-limiting example of the disclosure, the system comprises a network traffic adjustment unit that receives a common vulnerability score for the vulnerability, generates network utilization data for the computing resource asset based on data traffic to the computing resource asset compared to one or more other computing resource assets in the network, determines a network traffic adjustment (NTA) value for the common vulnerability score (CVSS) based on the network utilization data, and adjusts the common vulnerability score (CVSS) by the network traffic adjustment (NTA) value to generate a prioritized common vulnerability score (PCVSS) for the computing resource asset. The system can comprise a client device that remediates the vulnerability. Remediating the vulnerability can include a review or resolution of a vulnerability by a client device.

According to a further aspect of the disclosure, a method is provided for remediating a cyberattack risk in a computing resource asset in a network system, the method comprising: monitoring data traffic directed to the computing resource asset in the network system along with data traffic to one or more additional computing resource assets in the network system; generating network utilization data based on the monitored data traffic to the computing resource asset and the monitored data traffic to the one or more additional computing resource assets in the network system; receiving a common vulnerability score (CVSS) for a vulnerability in the computing resource asset; determining a network traffic adjustment (NTA) value for the common vulnerability score (CVSS) based on the network utilization data; adjusting the common vulnerability score (CVSS) by the network traffic adjustment (NTA) value to generate a prioritized common vulnerability score (PCVSS) for the computing resource asset; and remediating the computing resource asset to resolve the vulnerability based on the prioritized common vulnerability (PCVSS) score. Remediating the computing resource asset to resolve the vulnerability can include review the computing resource asset or vulnerability, or resolving the vulnerability.

The calculating the veritable score for the vulnerability can comprise adding the network traffic adjustment (NTA) value to the common vulnerability score (CVSS).

The network traffic adjustment (NTA) value can comprise a 0.0, a 1.0, or a 2.0.

The data traffic can be monitored by a Security Information and Event Management (STEM) system.

The data traffic can be monitored based on a server log.

The network utilization data can comprise an amount of traffic value $T_i$ that represents an amount of data traffic passing through or received by the computing resource asset.

The network utilization data can comprise a pro rata traffic value ($T_{PRi}$) for the computing resource asset.

The network utilization data can comprise a ranking threshold.

The ranking threshold can be based on a percentile of network traffic directed to the computing resource asset compared to overall network traffic in a user environment during a predetermined period of time.

The common vulnerability score can comprise a Common Vulnerability Scoring System (CVSS) score.

The common vulnerability score can comprise a base score.

The common vulnerability score can comprise at least one of a temporal score and an environment score that fine tunes the base score.

According to a further aspect of the disclosure, a non-transitory computer readable medium having stored thereon instructions for remediating a vulnerability in a computing resource asset in a network system comprising machine executable code which, when executed by at least one computing device, causes the at least one computing device to perform steps comprising: monitoring data traffic directed to the computing resource asset in the network system along with data traffic to one or more additional computing resource assets in the network system; generating network utilization data based on the monitored data traffic to the computing resource asset and the monitored data traffic to the one or more additional computing resource assets in the network system; receiving a common vulnerability score (CVSS) for a vulnerability in the computing resource asset; determining a network traffic adjustment (NTA) value for the common vulnerability score (CVSS) based on the network utilization data; adjusting the common vulnerability score (CVSS) by the network traffic adjustment (NTA) value to generate a prioritized common vulnerability score (PCVSS) for the computing resource asset; and remediating the computing resource asset to resolve the vulnerability based on the prioritized common vulnerability (PCVSS) score.

The step of adjusting the common vulnerability score (CVSS) by the network adjustment (NTA) value can comprise adding the network traffic adjustment (NTA) value to the common vulnerability score.

The network utilization data can comprise an amount of traffic value $T_i$ that represents an amount of data traffic passing through or received by the computing resource asset, a pro rata traffic value ($T_{PRi}$) for the computing resource asset, or a ranking threshold.

The ranking threshold can be based on a percentile of network traffic directed to the computing resource asset compared to overall network traffic in a user environment during a predetermined period of time.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 4A shows an example of vulnerability ratings that can be generated for a vulnerability by the vulnerability processor in FIG. 2.

FIG. 4B shows an example of ranking thresholds that can be applied by the vulnerability processor in FIG. 2 to prioritize and rank each vulnerability for a specific period of time.

FIG. 4C shows an example of network traffic adjustment values that can be generated by the vulnerability processor in FIG. 2 based on respective ranking thresholds.

FIG. 4D shows an example of a veritable score matrix for vulnerabilities that can be generated by the vulnerability processor in FIG. 2.

Figure 1:
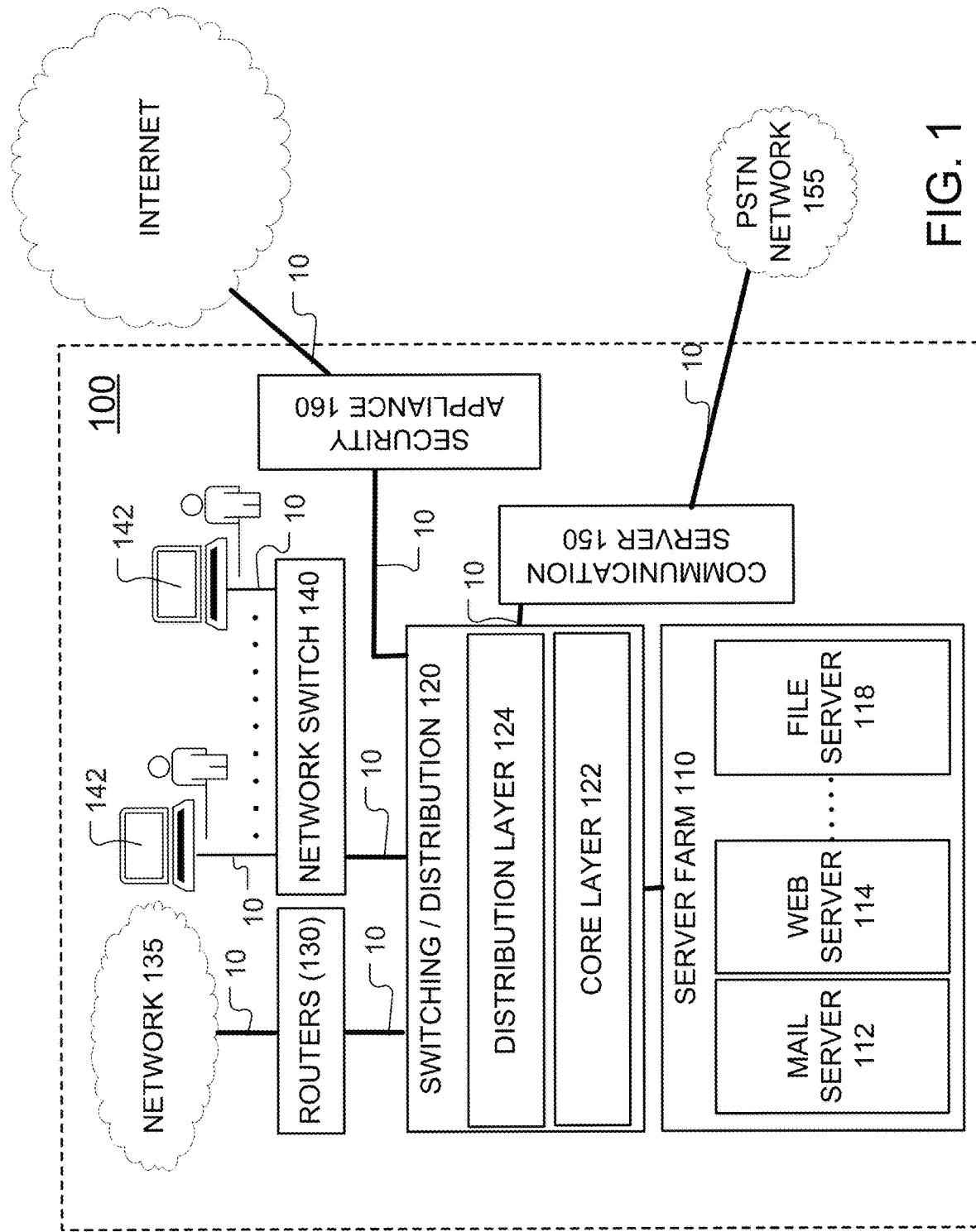
FIG. 1 shows a block diagram of an example of a network system that is constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows a non-limiting embodiment of a network system 100 that is constructed according to the principles of the disclosure. The network system 100 includes a plurality of computing resource assets, as seen in FIG. 1. The computing resource assets can include, for example, a server farm 110, one or more switching and distribution layers 120, one or more routers 130, one or more network switches 140, a communication server 150, and a security server 160, all of which can be interconnected by communication links 10. The network system 100 can include a firewall that shields the computing resource assets in the network from cyber-attacks.

The network system 100 can include one or more modems (not shown) configured for one or more cellular network standards, including, but not limited to, for example, GSM, WiMAX, LTE-TDD/TD-LTE, LTE Advanced (E-UTRA), LTE Advanced Pro, HiperMAN, Mobile WiMAX, Flash-OFDM, iBurst, CDMA2000, HSPA, UMTS, WiDEN, GPRS, CDPD, D-AMPS, NMT, AMPS, or the like, or any other modulating/demodulating device that can facilitate transmission of short message services (SMS) messages, or the like, over the public switched telephone network (PSTN), the public land mobile network (PLMN), or the like. The network system 100 can include computing devices and communicating devices.

The server farm 110 can include a plurality of computing resource assets, including, for example, a mail server 112, a web server 114, and a file server 118. The communication server 150, which can be located on an intranet, can be located in the server farm 110. The intranet can include all of the foregoing computing resource assets and a firewall to protect against threats and breach attempts made against the network system 100. The server farm 110 can include large numbers of computing resource assets that are accessible to other computing resource assets, including, for example, one or more client devices 142, one or more computing devices, or one or more communicating devices in the network system 100.

The security server 160 can include hardware, firmware, or software that provides security analysis and vulnerability detection and identification, malware protection, application visibility and control, reporting, secure mobility, and protection against threats that can arise during connection to communicating devices or the Internet. The security server 160 can include a firewall. The security server 160 can include one or more security analyzers (not shown) that can detect, identify and assess vulnerabilities across many disparate hardware, firmware or software platforms. The security analyzers (not shown) can include, for example, Static Application Security Testing (SAST) tools, Dynamic Application Security Testing (DAST) tools, Software Composition Analysis (SCA) tools, Database Security Scanning (DSS) tools, Mobile Application Security Testing (MAST) tools, Interactive Application Security Testing (IAST) tools, Application Security Testing as a Service (ASTaaS) tools, Correlation tools, Test Coverage Analyzer tools, Application Security Testing Orchestration (ASTO) tools, logging and monitoring tools, log management tools, among many other tools that can analyze computing resource assets and detect, identify and assess vulnerabilities in those computing resource assets, as well as traffic received by or passing through the computing resource.

Figure 2:
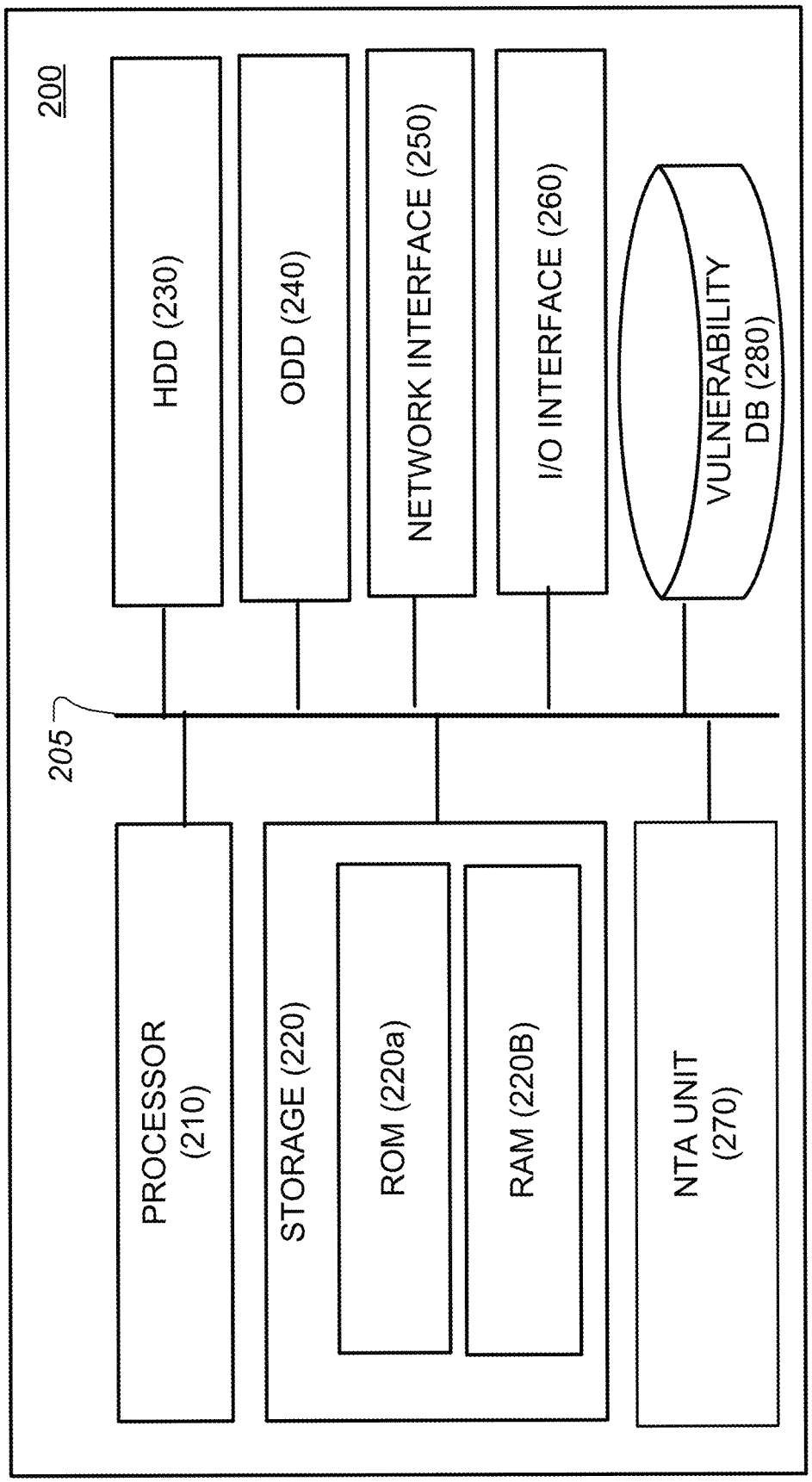
FIG. 2 shows an example of a vulnerability processor that can be included in a security server in the network system shown in FIG. 1.

The security server 160 can include a vulnerability processor 200 (shown in FIG. 2). The security server 160 can include a Security Information and Event Management (SIEM) system (not shown) that can capture and record traffic data received by or passing through computing resource assets in the network system 100 for monitoring and threat assessment. The traffic data (or network utilization data) can be received from, for example, server logs and stored in, for example, a vulnerabilities database 280 (shown in FIG. 2), where the traffic data can be stored and/or indexed with, for example, vulnerability scan report data in the vulnerabilities database 280. To prevent compromises to computing resource assets, the security server 160 can implement remediation to resolve vulnerabilities based on their veritable scores, including, for example, applying patches or fixes to the computing resource assets. Remediation can include reviewing the vulnerabilities and/or computing resource assets, or resolving the vulnerabilities.

The security scanning analysis can be generated by a security analyzer and can include one or more security scan results for each vulnerability detected in a computing resource asset. The security scan results can be analyzed by the security server 160, or a security analyst via a client device 142 in communication with the security server 160, to identify, assess, and/or apply remediation to the vulnerabilities in the computing resource assets. The security scanning analysis can be received from the security analyzer (not shown) in a file-based form, or any other form that facilitates analysis and review of the security scan results in the security scanning analysis by the security server 160, or a security analyst via the client device 142 that may be in communication with the security server 160.

The switching and distribution layers 120 can include a core layer 122 and a distribution layer 124. The core layer 122 can include one or more layers of switching devices (not shown) that connect the server farm 110 to the distribution layer 124. The distribution layer 124 can include one or more layers of switching devices (not shown) that connect the core layer 122 to the one or more routers 130, the one or more network switches 140, the communication server 150, or the security server 160. The switching and distribution layers 120 can include one or more routers (not shown).

The router(s) 130 can be connected to a network 135 or the Internet by a communication link 10. If a security scanning analysis is generated by a security analyzer (not shown) that is located outside of the network system 100, such as, for example, on a software vendor server on the Internet, the security scanning analysis can be received via the router 130 or directly by the security server 160 via a communication link 10. The network 135 can be located on an intranet, behind a firewall. The router(s) 130 can include a firewall (not shown). The network switch(es) 140 can be connected to one or more client devices 142 by one or more associated communication links 10. The network switch(es) 140 can include ethernet switches. Data packets can be securely transported between computing resource assets in the network system 100.

The communication server 150 can include a standards-based computing system that can operate as a carrier-grade common platform for a wide range of communications applications and facilitate communication over, for example, the PSTN 155 or the PLMN (not shown). The communication server 150 can include Internet message handling services (MHS) that transfer electronic mail messages between communicating devices in the network system 100 with communicating devices external to the network system 100. The MHS can include, for example, a message transfer agent or mail transfer agent (MTA), a mail relay, or the like. The communication server 150 can include a message delivery agent (MDA). The network system 100 can be connected to the Internet over one or more communication links 10.

FIG. 2 shows a non-limiting example of a vulnerability processor 200 that is constructed according to the principles of the disclosure and that can be included in, for example, the security server 160 (shown in FIG. 1). The vulnerability processor 200 can be configured to implement the various aspects of the disclosure. The vulnerability processor 200 includes a processor 210, a storage 220, a hard disk drive (HDD) 230, an optical disk drive (ODD) 240, a network interface 250, an input/output I/O interface 260, a network traffic adjustment (NTA) unit 270, a vulnerability database 280, and a system bus 205 that can be communicatively linked to each of the components in the vulnerability processor 200 by a communication link.

The system bus 205 can be any of several types of bus structures that can further interconnect to a memory bus (with or without a memory controller), a peripheral bus, and a local bus using any of a variety of commercially available bus architectures.

The processor 210 can be any of various commercially available processors. Dual microprocessors and other multi-processor architectures can also be employed as the processor.

The vulnerability processor 200 includes a computer-readable medium that can hold executable or interpretable computer code (or instructions) that, when executed by the processor 210, causes the steps, processes and methods described herein to be carried out. The computer-readable medium can be provided in the storage 220, HDD 230, or ODD 240. The computer readable medium can include sections of computer code that, when executed by the processor 210 and/or the NTA unit 270, cause the vulnerability processor 200 to carry a process 500 shown in FIG. 5, as well as all other process steps described or contemplated herein.

The storage 220 includes a read only memory (ROM) 220A and a random-access memory (RAM) 220B. The storage 220 can store security scanning analysis data, vulnerability scan report data, traffic data, CVSS data, risk adjustment weight data, veritable score data, and the like. A basic input/output system (BIOS) can be stored in the non-volatile memory 220A, which can include, for example, a ROM, an EPROM, an EEPROM, or the like. The BIOS can contain the basic routines that help to transfer information between components within the processing unit 200, such as during start-up. The RAM 220B can include a high-speed RAM such as static RAM for caching data.

The HDD 230 can include, for example, an enhanced integrated drive electronics (EIDE) drive, a serial advanced technology attachments (SATA) drive, or the like; and, the ODD 240 can read/write from/to a CD-ROM disk (not shown), or, read from or write to other high capacity optical media such as the DVD. The HDD 230 can be configured for external use in a suitable chassis (not shown). The HDD 230 and ODD 240 can be connected to the system bus 205 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The HDD 230 and/or ODD 240, and their associated computer-readable media, can provide nonvolatile storage of data, data structures, computer-executable instructions, and the like. The HDD 230 and/or ODD 240 can accommodate the storage of any data in a suitable digital format. The storage 220, HDD 230, and/or ODD 240 can include one or more apps that are used to execute aspects of the architecture described herein.

A number of program modules can be stored in the HDD 230, ODD 240, and/or RAM 220B, including an operating system (not shown), one or more application programs (not shown), other program modules (not shown), and program data (not shown). Any (or all) of the operating system, application programs, program modules, and program data can be cached in the RAM 220B as executable sections of computer code.

The network interface 250 can be connected to the network 135 or the Internet (shown in FIG. 1). The network interface 250 can include a wired or a wireless communication network interface (not shown) and/or a modem (not shown). When used in a local area network (LAN), the vulnerability processor 200 can be connected to the LAN network (e.g., network 135, shown in FIG. 1) through the wired and/or wireless communication network interface; and, when used in a wide area network (WAN), the vulnerability processor 200 can be connected to the WAN network through the modem. The network 135 (shown in FIG. 1) can include a LAN, a WAN, or the like. The modem (not shown) can be internal or external and wired or wireless. The modem can be connected to the system bus 205 via, for example, a serial port interface (not shown).

The I/O interface 260 can receive commands and data from an operator via the I/O interface, which can be communicatively coupled to one or more input/output devices, including, for example, a keyboard (not shown), a mouse (not shown), a pointer (not shown), a microphone (not shown), a speaker (not shown), a display (not shown), and/or the like. The received commands and data can be forward to the processor 210 from the I/O interface 260 as instruction and data signals via the bus 205.

The NTA unit 270 can be a device or a module that is separate from the processor 210, as seen in FIG. 2, or it can be integrated with the processor 210. The NTA unit 270 can be connected to the system bus 205 and configured to receive at an input (not shown) a security scanning analysis from a security analyzer (not shown). The NTA unit 270 can receive, for example, a security scanning analysis, such as, for example, a UNIX file-based security scanning analysis. Alternatively, the NTA unit 270 can receive any security scanning analysis, including those that are not UNIX-based or UNIX file-based. The instant disclosure is not limited to any particular type of security scanning analysis.

The vulnerability database 280 can store vulnerability records for each computing resource asset in the network system 100 that has been analyzed for vulnerabilities, including, for example, vulnerability scan report data, traffic data, CVSS data, risk adjustment weight data, veritable score data, and the like. The vulnerability database 280 can be accessed by the NTA unit 270, as well as other computing resource assets in the vulnerability processor 200. The vulnerability database 280 can receive queries and, in response, retrieve specific records or portions of records based on the queries. The vulnerability database 280 can include a database management system (DBMS) that can interact with the NTA unit 270, as well as the other computing resource asses in the vulnerability processor 200. The DBMS can interact with computing resource assets outside of the vulnerability processor 200. The vulnerability database 280 can include relational databases.

Figure 3:
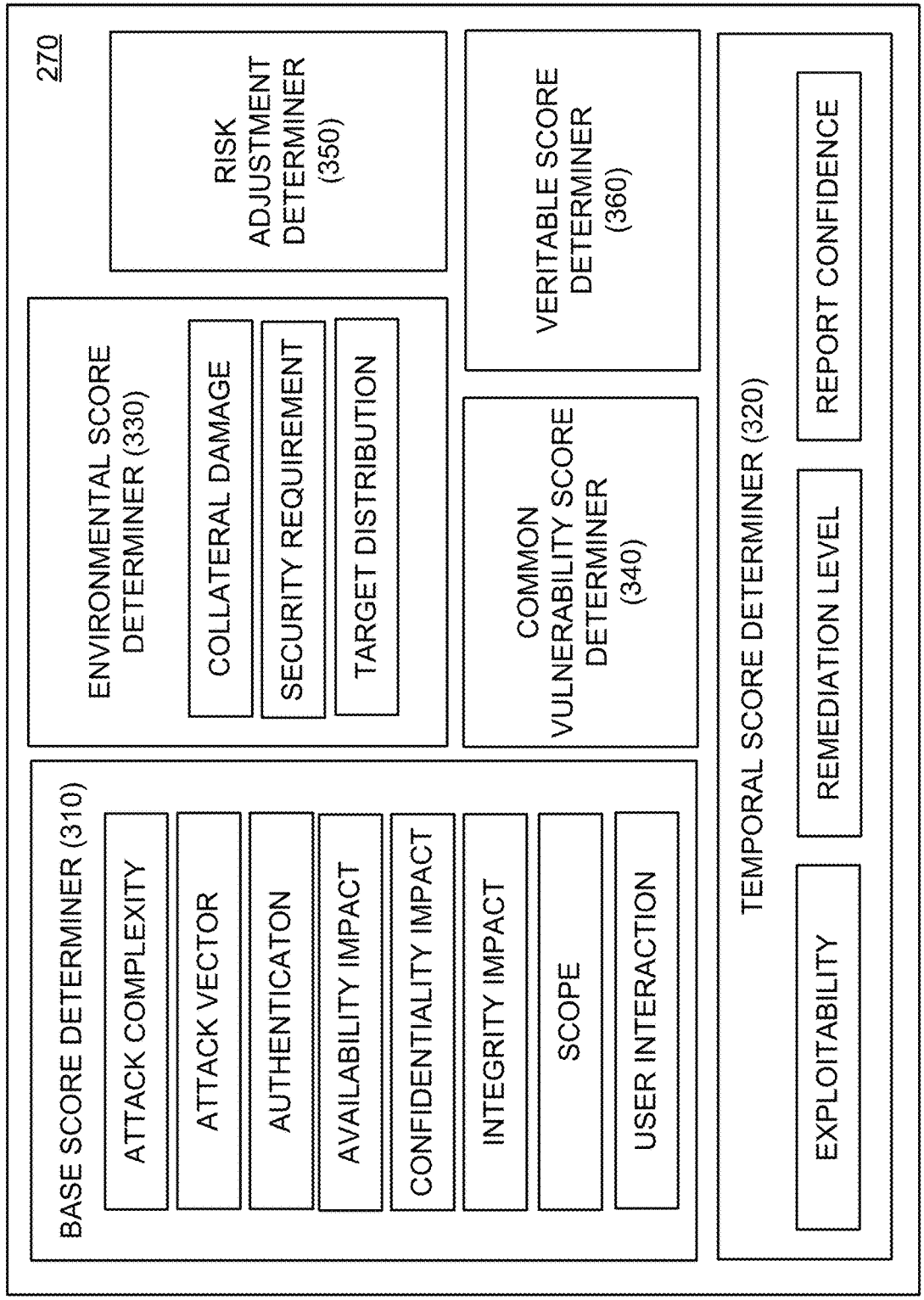
FIG. 3 shows an example of a network traffic adjustment (NTA) unit that can be included in the vulnerability processor in FIG. 2.

FIG. 3 shows an example of a NTA unit 270 that is constructed according to the principles of the disclosure. The NTA unit 270 can include a base score determiner 310, a temporal score determiner 320, an environmental score determiner 330, a common vulnerability (CV) score determiner 340, a risk adjustment (RA) determiner 350, and a veritable score determiner 360, each of which can be a device or a module that is separate from the processor 210 (shown in FIG. 2), or which can be integrated with the processor 210. The RA determiner 350 and veritable score determiner 360 can be provided as a single device or module, or as separate devices or modules.

The base score determiner 310 can interact with the vulnerability database 280 (shown in FIG. 2) and receive data packets from the database that include vulnerability information for a computing resource asset or a group of computing resource assets that have been scanned and analyzed for vulnerabilities. The base score determiner 310 can identify, assess, and score intrinsic and fundamental characteristics of a vulnerability that are substantially constant over time and user environments.

According to a non-limiting example, the base score determiner 310 can include an attack (or access) complexity determiner, an attack (or access) vector determiner, an authentication (or a privileges required) determiner, an availability impact determiner, a confidentially impact determiner, an integrity impact determiner, a user interaction determiner, and/or a scope determiner, each of which can function according to, for example, the CVSSv3.0 standard. The base score determiner 310 can include fewer than the foregoing elements, or additional elements to identify and assess other qualities of a vulnerability that do not change with time or user environment. A description of the CVSSv3.0 standard can be found at <<https://www.first.org/cvss/ specification-document>>. When base metrics in the foregoing elements in the base score determiner 310 are assigned values, as can be done with base metrics in, for example, the CVSSv3.0 standard, the base score determiner 310 can compute a base score ranging from, for example, 0.0 to 10.0, and generate a vector, which can include a text string that contains the values assigned to each metric to facilitate visibility into the calculations carried out by each element in the base score determiner 310. The assigned values, base score, and base vectors can be stored in the vulnerability database 280 in the record(s) associated with the vulnerability, or in a separate location in the database and linked to the associated vulnerability by means of, for example, indexing.

The temporal score determiner 320 can identify and assess characteristics of a vulnerability that change with time, but that are substantially constant with respect to user environments. The temporal score determiner 320 can interact with the vulnerability database 280 (shown in FIG. 2) and receive data packets from the database that include vulnerability information for the computing resource asset or the group of computing resource assets in the database. The received data packets can include base score data and base vector data generated by the base score determiner 310 and stored in the vulnerability database 280. Alternatively (or additionally), the temporal score determiner 320 can interact with the base score determiner 310 to receive the base score data and base vector data for the vulnerability.

According to a non-limiting example, the temporal score determiner 320 can include an exploitability determiner, a remediation level determiner, and/or a report confidence determiner, each of which can function according to, for example, the CVSSv3.0 standard. The temporal score determiner 320 can include fewer than the foregoing elements, or additional elements to identify and assess other qualities of a vulnerability that change over time, but do not change with regard to user environments. The temporal score determiner 320 can process the received base score and base vector data and, using temporal metrics in, for example, the exploitability determiner, remediation level determiner, and report confidence determiner according to the CVSSv3.0 standard, generate temporal score data and temporal vector data, wherein the temporal score data includes a temporal score for the vulnerability.

The environmental score determiner 330 can identify and assess characteristics of a vulnerability that are related to a particular user environment. In the instant disclosure, the user environment can include the network system 100 (shown in FIG. 1), or a subsystem of the network system 100, such as, for example, the network 135 (shown in FIG. 1). The environmental score determiner 330 can interact with the vulnerability database 280 (shown in FIG. 2) and receive data packets from the database that include vulnerability information for the computing resource asset or the group of computing resource assets in the database. The received data packets can include temporal score data and temporal vector data. The received data packets can include the base score data and the base vector data. Alternatively (or additionally), the environmental score determiner 330 can interact with the base score determiner 310 or the temporal score determiner 320 to receive the score data and vector data for the vulnerability.

According to a non-limiting example, the environmental score determiner 330 can include a collateral damage determiner, a security requirement determiner, and/or a target distribution determiner, each of which can function according to, for example, the CVSSv3.0 standard. The environmental score determiner 330 can include fewer than the foregoing elements, or additional elements to identify and assess other qualities of a vulnerability that are unique to the particular user environment (e.g., network system 100, or a subsystem in the network system 100). The environmental score determiner 330 can process the received temporal score data and/or base score data, as well as the temporal vector data and/or base vector data and, using environmental metrics in, for example, the collateral damage determiner, security requirement determiner, and target distribution determiner according to the CVSSv3.0 standard, generate environmental score data and environmental vector data, wherein the environmental score data includes an environmental score for the vulnerability.

The common vulnerability score determiner 350 can receive the base score data and base vector data from the base metric determiner 310 or the vulnerability database 280 and, as set forth in, for example, the CVSSv3.0 standard, generate an overall common vulnerability score. Additionally, the common value score determiner 350 can receive the temporal score data and temporal vector data from the temporal score determiner 320 or the vulnerability database 280. The common value score determiner 350 can receive the environmental score data and environmental vector data from the environmental score determiner 330 or the vulnerability database 280. The common vulnerability score determiner 350 can refine the base score data based on temporal and/or environmental score data, as set forth in, for example, the CVSSv3.0 standard, to generate the overall common vulnerability score. Since the base score and vector can be sufficient in certain applications, the common vulnerability score determiner 350 can generate the overall common vulnerability score based on the base score and base vector data alone. The common vulnerability score can range from, for example, 0.0 to 10.0. Alternatively, the common vulnerability score can range from any predetermined minimum value (e.g., 0.00) to any predetermined maximum value (e.g., 100.00). The common vulnerability score determiner 350 can generate a criticality rating (e.g., "None," "Low," "Medium," "High," "Critical") based on the common vulnerability score.

FIG. 4A shows an example of criticality ratings that the common vulnerability score determiner 350 can assign to discrete bands of common vulnerability scores. As seen, for an CVSS score of 0.0, the common vulnerability score determiner 350 may not generate a rating, but, for CVSS score bands of, for example, 0.1-3.9, 4.0-6.9, 7.0-8.9, and 9.0-10.0, the common vulnerability determiner 350 can generate criticality ratings of, for example, "Low," "Medium," "High," and "Critical," respectively. Additional criticality ratings are contemplated herein, including discrete subsets of each of the five foregoing ratings, such as, for example, a "Critical-Low" for CVSS scores of 9.0 to 9.3, "Critical-Medium" for CVSS scores of 9.4-9.7, and "Critical-High" for CVSS scores of 9.8-10.0.

While common vulnerability scores and associated criticality ratings can facilitate prioritization and classification of vulnerabilities based on risks associated with the vulnerabilities, this approach does not provide satisfactory results under real-world conditions and can generate ambiguous results that do not reflect the true risks associated with vulnerabilities in computing resource assets. This disadvantage can result in erroneous prioritization and remediation of non-critical or less critical vulnerabilities at the expense of forgoing remediation of truly critical vulnerabilities in computing resource assets where resources such as time or computing power might be restricted. For example, this can happen where a truly critical vulnerability is assigned a "Medium" criticality rating and is not remediated because many other vulnerabilities are assigned "Critical" criticality ratings and there are insufficient resources to address vulnerabilities having a "Medium" criticality rating. The erroneous prioritization and remediation can leave critical vulnerabilities in place, thereby exposing the user environment to a heightened risk of successful cyberattacks that can potentially severely impact the user environment.

The veritable score determiner 360 can reclassify and reprioritize vulnerabilities based on network traffic information to identify, assess and prioritize the vulnerabilities according to the true risks associated with those vulnerabilities, so that remediation can be carried out efficiently, accurately, and effectively. The veritable score determiner 360 can receive the common vulnerability score data and associated vector data, as well as any other data necessary to identify the computing resource assets and vulnerabilities, from the common vulnerability score determiner 350, and apply a network traffic adjustment value to each common vulnerability score to generate a veritable score for each vulnerability. Instead of, or in addition to receiving the score and vector data from the common vulnerability score determiner 350, the veritable score determiner 360 can receive the score data and vector data from the vulnerability database 280 (shown in FIG. 2). The veritable score determiner 360 can receive the network traffic adjustment value data from the risk adjustment determiner 350 or the vulnerability database 280.

According to a non-limiting example of the disclosure, the network traffic adjustment value can be, for example, "0", "1.0", or "2.0." In this example, the common vulnerability score can be modified based on the network traffic adjustment value to add 0, 1.0, or 2.0 to each score, depending on the traffic data for the associated computing resource asset. The traffic data can include information about the amount of traffic to/from the computing resource asset relative to other computing resource assets in the user environment. For any given computing resource asset, the traffic data (or network utilization data) can include, for example, information about the number of computing devices or communicating devices having unique IP addresses that accessed or attempted to access the computing resource asset, the amount of data (e.g., in bytes, kilobytes, megabytes, etc.) received by or transmitted to the computing resource asset, the length of each session between the computing resource asset and the computing devices or communicating devices during which data packets were transmitted, the port numbers used during communication, and any other information that can provide a comprehensive summary of the utilization or attempted utilization of the computing resource asset. The network utilization data can include ranking thresholds (discussed below).

The risk adjustment determiner 350 can receive traffic data for each computing resource asset from, for example, the STEM system (not shown), which can be located in the security server 160 (shown in FIG. 1) or the vulnerability database 280 (shown in FIG. 2). The traffic data can include information about the amount of traffic ($T_i$) that is received by or passes through each computing resource asset in the user environment. Based on the received traffic data, the risk adjustment determiner 350 can know the amount of traffic $T_i$ received by or passing through each computing resource asset and determine a pro rata traffic value ($T_{PRi}$) for each computing resource asset by, for example, dividing the amount of traffic $T_i$ passing through the computing resource asset by the aggregate sum of the amounts of traffic passing through all of the computing resource assets in the user environment for which traffic data is received by the risk adjustment determiner 350.

The following equation illustrates the relationship, $$T_{PR1}(t) = \frac{T_1(t)}{\sum_{i=1}^{n} T_i(t)}$$

where $T_{PR1}$ is the pro rata traffic value for a computing resource asset 1 out of n computing resource assets in the user environment for which traffic data is received by the risk adjustment determiner 350; n is a positive integer greater than or equal to 1. As noted above, $T_i$ is the amount of traffic passing through a computing resource asset i, where i can be anyone of the computing resource assets 1 to n in the user environment. As seen in the equation above, the determination is made as a function of time, so that traffic data can be collected for each computing resource asset during a predetermined time interval t, which can be, for example, in seconds, minutes, hours, days, etc., or any range of values that is adequate to provide an accurate assessment of the traffic flow in/to each computing resource asset compared to the other computing resource assets in the user environment.

Once pro rata traffic values $T_{PR1}$ to $T_{PRn}$ have been determined for all computing resource assets, the risk adjustment determiner 350 can prioritize and rank the computing resource assets based on their respective pro rata traffic values. For example, the risk adjustment determiner 350 can prioritize the computing resource assets from lowest traffic potential to highest traffic potential and rank each computing resource asset based on one or more traffic thresholds.

FIG. 4B shows an example of three ranking thresholds that can be applied to prioritize and rank each computing resource asset for a specific period of time. As seen in FIG. 4B, the three ranking thresholds can be set to, for example, a "Low" ranking threshold for computing resource assets that have a pro rata traffic value $T_{PRi}$ that is in the lowest percentile (e.g., 40% percentile) of network traffic, a "Medium" ranking threshold for computing resource assets that have a pro rata traffic value $T_{PRi}$ that is in the middle percentile (e.g., 40% to 80% percentile) of network traffic, and a "High" ranking threshold for computing resource assets that have a pro rata traffic value $T_{PRi}$ that is in the top percentile (e.g., 20% percentile) of network traffic. After the ranking thresholds have been determined and applied to rank each of the computing resource assets, the risk adjustment determiner 350 can determine the network traffic adjustment value (e.g., "0.0", "1.0", or "2.0") for each computing resource asset based on the ranking threshold.

FIG. 4C shows an example of three network traffic adjustment values (0.0, +1.0, +2.0) that can be generated based on the three respective ranking thresholds (Low, Medium, High). The risk adjustment determiner 350 can send the network traffic adjustment value data, including the network traffic adjustment values, to the veritable score determiner 360. The network traffic adjustment value data can include additional data necessary to identify the associated computing resource assets. The veritable score determiner 360 can receive the network traffic adjustment value data from the vulnerability database 280 (shown in FIG. 2).

FIG. 4D shows an example of a veritable score matrix for three vulnerabilities (e.g., A, B, C) that can be generated by the veritable score determiner 360 (shown in FIG. 3), according to a non-limiting example of the disclosure.

Referring to the FIGS. 3 and 4A-4D, the veritable score determiner 360 can apply the network traffic adjustment values to the common vulnerability scores for the vulnerabilities, for example, A, B, C (shown in FIG. 4D), and generate veritable scores ("New score") for each of the vulnerabilities. In this non-limiting example, the veritable score determiner 360 receives three common vulnerability scores ("CVSS score") 2.1, 6.0, and 7.5 for three respective vulnerabilities A, B, C. The veritable score determiner 360 also receives respective criticality ratings ("Old rating") for each of the vulnerabilities A, B, C. At the same time (or at a different time), the veritable score determiner 360 can receive ranking thresholds Medium, High, and Low and network traffic adjustment values 1.0, 2.0, 0.0 for the vulnerabilities A, B, C, respectively. After receiving the common vulnerability scores (e.g., 2.1, 6.0, 7.5) and ranking thresholds (e.g., Medium, High, Low) (and/or network traffic adjustment values) for the vulnerabilities A, B, C, respectively, the veritable score determiner 360 can apply the network traffic adjustment values (e.g., +1.0, +2.0, 0.0) to the common vulnerability scores to generate veritable scores (e.g., 2.1+1.0=3.1, 6.0+2.0=8.0, 7.5+0=7.5). The veritable scores and new criticality ratings can be used to reclassify and reprioritize remediation of the vulnerabilities A, B, C, including assigning the highest priority to vulnerability B, followed by vulnerabilities C and A, for remediation, which can be carried out by the security server 160 (shown in FIG. 1) or the client device 142 (shown in FIG. 1), as discussed above.

As seen in this example, the vulnerability B can be reclassified and reprioritized based on traffic data from, for example, a Medium rating vulnerability to a High rating vulnerability that should be analyzed and/or remediated with greater priority. As evident from this example, the technology solution disclosed herein improves timely remediation, remediation effectiveness, and efficiency, allowing for vulnerability assessment and remediation of large numbers of computing resource assets with limited available resources (e.g., computing resources, human resources, etc.).

In an alternative example, the veritable score determiner 360 can include a look-up-table or other mapping means to map each received ranking threshold to the associated network traffic adjustment value, so the veritable score determiner would only need to receive the ranking thresholds from the risk adjustment determiner 350 or the vulnerability database 280. Alternatively, the veritable score determiner 360 can be configured to receive only the network traffic adjustment values from the risk adjustment determiner 350 or the vulnerability database 280, in which case the look-up-table or other mapping means can be referenced to retrieve the ranking thresholds that are associated with the received network traffic adjustment values.

Figure 5:
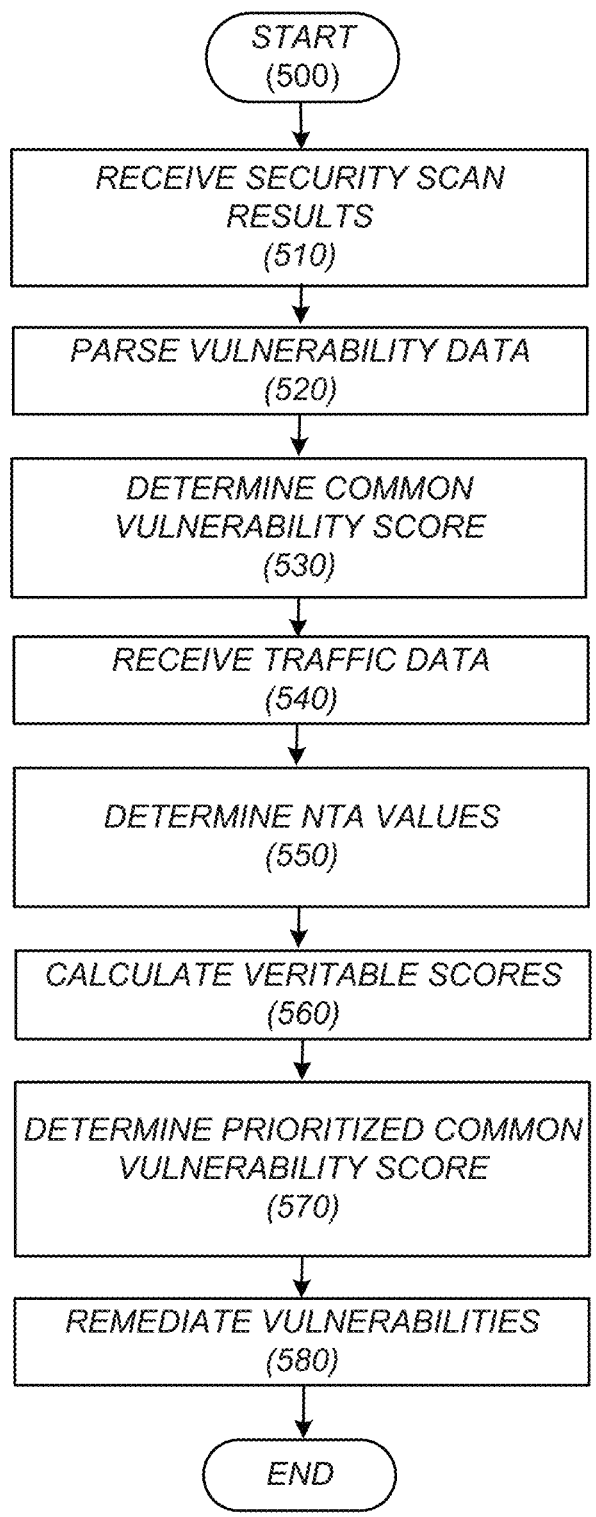
FIG. 5 shows an example of veritable vulnerability assessment and remediation process, according to the principles of the disclosure.

FIG. 5 shows an example of a veritable vulnerability assessment and remediation process 500, according to the principles of the disclosure. The process 500 can be carried out by the security server 160 (shown in FIG. 1). The security server 160 can include or can access a computer readable medium that contains a computer program, which, when executed on one or more of computing devices, cause the process 500 to be carried out. The computer program can be tangibly embodied in the computer readable medium, comprising one or more program instructions, code segments, or code sections for performing each of the steps in the process 500 shown in FIG. 5, when executed by the one or more computing devices.

Referring to FIG. 5, security scan results for a computing resource asset can be received in the form of security san results data packets by the vulnerability processor 200 (shown in FIG. 2) from a security analyzer (not shown) or a vulnerability database 280 (shown in FIG. 2) (Step 510). The security analyzer (not shown) can be located in the security server 160 (shown in FIG. 1), or elsewhere in the user environment, or it can be located at a third-party site that is external to the user environment, such as, for example, at a vendor site. The security san results can include vulnerability data for a computing resource asset in the user environment.

The vulnerability data can be parsed from the security scan results data packets (Step 520) by, for example, the vulnerability processor 200 (shown in FIG. 2). The vulnerability data can be analyzed using, for example, at least one of basic metrics, temporal metrics, and environmental metrics as defined in the CVSS standard (e.g., CVSSv1.0, CVSSv2.0, CVSSv3.0, etc.), to determine a common vulnerability score (Step 530). Instead of, or in addition to the CVSS standard scoring scheme, any other vulnerability scoring scheme can be used that provides a repeatable, accurate score that can be implemented to classify and prioritize vulnerabilities based on their characteristics.

The vulnerability processor 200 (shown in FIG. 2) can receive traffic data related to each computing resource asset for which vulnerability data was received and analyzed in Steps 510-530 (Step 540). As noted previously, the traffic data can be received from, for example, the SIEM system (not shown) or the vulnerability database 280 (shown in FIG. 2). The traffic data can include information about the amount of traffic $T_i$ that is received by or passes through a particular computing resource asset or group of computing resource assets in the user environment. Based on the received traffic data, the vulnerability processor 200 (shown in FIG. 2) can determine a pro rata traffic value $T_{PRi}$ for the computing resource asset and determine a network traffic adjustment value for each vulnerability associated with the computing resource asset (Step 550). The vulnerability processor 200 can also determine a network traffic adjustment value for each of the vulnerabilities in the other computing resource assets in the user environment for which vulnerability data was received in Step 510. According to a non-limiting example of the disclosure, the determined network traffic adjustment values can include, for example, "0", "1.0", or "2.0."

The vulnerability processor 200 (shown in FIG. 2) can then adjust the common vulnerability score for each vulnerability based on the network traffic adjustment values to add 0, 1.0, or 2.0 to each score to calculate a veritable score for each vulnerability (Step 560). The vulnerability processor 200 can determine a prioritized common vulnerability score (PCVSS) based on the veritable scores (Step 570). The PCVSS score can include the network traffic adjustment value and the veritable score for each vulnerability. The PCVSS score can be prioritized (or classified) based on the veritable score and/or the network traffic adjustment value for each vulnerability for remediation. For instance, as seen in FIG. 4D, based on the PCVSS score, the vulnerabilities A-C may be prioritized so that vulnerability B is first remediated, followed by vulnerability C, and finally by vulnerability A (Step 570). The security server 160 (shown in FIG. 1) or the client device 140 (shown in FIG. 1) can apply remediation to the computing resource asset based on the PCVSS score for each of the vulnerabilities associated with the computing resource asset (Step 580).

The terms "a," "an," and "the," as used in this disclosure, means "one or more," unless expressly specified otherwise.

The term "client device," as used in this disclosure, means a computer or a communicating device that is configured to operate in the network system 100, including transmitting data and instructions signals over one or more communication links.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource asset," as used in this disclosure, means a client device, a computing device, a communication device, a communication link, software, a software application, a web application, a web page, a computer application, a computer program, computer code, machine executable instructions, firmware, or the like. A computing resource asset can include any device that has an Internet Protocol (IP) address, including, for example, a router, a switch, a server, a printer, a scanner, a computing device, a communicating device, or the like.

The term "computer readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

The term "user environment," as used in this disclosure, means a network, an enterprise network, a public network, a private network, or any configuration that includes two or more computing devices. The user environment can include the network system 100 (shown in FIG. 1), or a subsystem of the network system 100, such as, for example, the network 135 (shown in FIG. 1).

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for remediating a cyberattack risk in a computing resource asset in a network system, the method comprising:
    monitoring data traffic directed to a computing resource asset in a network system along with data traffic to one or more additional computing resource assets in the network system;
    generating network utilization data based on the monitored data traffic to the computing resource asset and the monitored data traffic to the one or more additional computing resource assets in the network system;
    receiving a Common Vulnerability Scoring System score for a vulnerability in the computing resource asset;
    determining a network traffic adjustment value for the Common Vulnerability Scoring System score based on the network utilization data;
    calculating a sum of the Common Vulnerability Scoring System score and the network traffic adjustment value by numerically adding the network traffic adjustment value to the Common Vulnerability Scoring System score to generate a prioritized common vulnerability score for the computing resource asset; and
    remediating the computing resource asset to resolve the vulnerability based on the prioritized common vulnerability score,
    wherein the network traffic adjustment value comprises a 0.0, a 1.0, or a 2.0,
    wherein the data traffic is monitored based on a server log,
    wherein the network utilization data comprises a ranking threshold
    based on a predetermined percentile range of network traffic directed to the computing resource asset during a predetermined period of time,
    wherein the network utilization data is selected from an amount of traffic value and a pro rata traffic value,
    wherein the amount of traffic value represents an amount of data traffic passing through or received by the computing resource asset, and
    wherein the pro rata traffic value is associated with the computing resource asset.

2. The method in claim 1, wherein the data traffic is monitored by a Security Information and Event Management system.

3. The method in claim 1, wherein the Common Vulnerability Scoring System score comprises a base score.

4. The method in claim 3, wherein the Common Vulnerability Scoring System score comprises at least one of a temporal score and an environment score that fine tunes the base score.

5. A non-transitory computer readable medium having stored thereon instructions for remediating a vulnerability in a computing resource asset in a network system comprising machine executable code which, when executed by at least one computing device, causes the at least one computing device to perform steps comprising:
    monitoring data traffic directed to a computing resource asset in a network system along with data traffic to one or more additional computing resource assets in the network system;
    generating network utilization data based on the monitored data traffic to the computing resource asset and the monitored data traffic to the one or more additional computing resource assets in the network system;
    receiving a Common Vulnerability Scoring System score for a vulnerability in the computing resource asset;
    determining a network traffic adjustment value for the Common Vulnerability Scoring System score based on the network utilization data;
    calculating a sum of the Common Vulnerability Scoring System score and the network traffic adjustment value by numerically adding the network traffic adjustment value to the Common Vulnerability Scoring System score to generate a prioritized common vulnerability score for the computing resource asset; and
    remediating the computing resource asset to resolve the vulnerability based on the prioritized common vulnerability score,
    wherein the network traffic adjustment value comprises a 0.0, a 1.0, or a 2.0,
    wherein the data traffic is monitored based on a server log,
    wherein the network utilization data comprises a ranking threshold, and
    based on a predetermined percentile range of network traffic directed to the computing resource asset during a predetermined period of time,
    wherein the network utilization data is selected from an amount of traffic value and a pro rata traffic value, wherein the amount of traffic value represents an amount of data traffic passing through or received by the computing resource asset, and wherein the pro rata traffic value is associated with the computing resource asset.

6. The non-transitory computer readable medium in claim 5, wherein the network utilization data is based on traffic data received from a Security Information and Event Management system.

7. A cyberattack risk remediation system for remediating a vulnerability in a computing resource asset in a network, the system comprising:

a network traffic adjustment unit that
receives a Common Vulnerability Scoring System score for a vulnerability on a computing resource asset in a network,
generates network utilization data for the computing resource asset based on data traffic to the computing resource asset compared to one or more other computing resource assets in the network,
determines a network traffic adjustment value for the Common Vulnerability Scoring System score based on the network utilization data, and
calculates a sum of the Common Vulnerability Scoring System score and the network traffic adjustment value by numerically adding the network traffic adjustment value to the Common Vulnerability Scoring System score to generate a prioritized common vulnerability score for the computing resource asset; and a client device that remediates the vulnerability,
wherein the network traffic adjustment value comprises a 0.0, a 1.0, or a 2.0,
wherein the data traffic is monitored based on a server log,
wherein the network utilization data comprises a ranking threshold
based on a predetermined percentile range of network traffic directed to the computing resource asset during a predetermined period of time,
wherein the network utilization data is selected from an amount of traffic value and a pro rata traffic value,
wherein the amount of traffic value represents an amount of data traffic passing through or received by the computing resource asset, and
wherein the pro rata traffic value is associated with the computing resource asset.

* * * * *